(12) United States Patent
May et al.

(10) Patent No.: US 9,494,802 B2
(45) Date of Patent: Nov. 15, 2016

(54) STEREOSCOPIC OPTICS

(75) Inventors: Kevin Brent May, Yorba Linda, CA (US); Richard J. Michaels, Irvine, CA (US)

(73) Assignee: Reach3D Medical LLC, Suwanee, GA (US)

( * ) Notice: Subject to any disclaimer, the term of this patent is extended or adjusted under 35 U.S.C. 154(b) by 416 days.

(21) Appl. No.: 13/879,785

(22) PCT Filed: Oct. 18, 2011

(86) PCT No.: PCT/US2011/056712
§ 371 (c)(1),
(2), (4) Date: Jun. 18, 2013

(87) PCT Pub. No.: WO2012/054481
PCT Pub. Date: Apr. 26, 2012

(65) Prior Publication Data
US 2013/0258462 A1    Oct. 3, 2013

Related U.S. Application Data

(60) Provisional application No. 61/394,046, filed on Oct. 18, 2010.

(51) Int. Cl.
*G02B 27/22* (2006.01)
*G02B 21/22* (2006.01)

(52) U.S. Cl.
CPC ............... *G02B 27/22* (2013.01); *G02B 21/22* (2013.01); *G02B 27/225* (2013.01); *G02B 27/2264* (2013.01)

(58) Field of Classification Search
CPC ...... G02B 21/00; G02B 21/02; G02B 21/04; G02B 21/18; G02B 21/30; G02B 21/22; G02B 21/365; G02B 21/367; G02B 21/0052
USPC ................................. 359/368, 372, 374–378
See application file for complete search history.

(56) References Cited

U.S. PATENT DOCUMENTS

| | | |
|---|---|---|
| 2,639,653 A | 5/1953 | Fischer |
| 3,574,295 A | 4/1971 | Tasaki |
| 3,712,199 A | 1/1973 | Songer |
| 3,820,882 A | 6/1974 | Jakubowski |
| 4,143,938 A | 3/1979 | Feinbloom et al. |
| 4,272,161 A | 6/1981 | Feinbloom et al. |
| 4,300,167 A | 11/1981 | Miller et al. |
| 4,344,667 A | 8/1982 | Wooff, Jr. |
| 4,418,993 A | 12/1983 | Lipton et al. |

(Continued)

FOREIGN PATENT DOCUMENTS

| | | |
|---|---|---|
| CN | 1910495 A | 2/2007 |
| GB | 606065 A | 8/1948 |

(Continued)

*Primary Examiner* — Ricky Mack
*Assistant Examiner* — Robert E Tallman
(74) *Attorney, Agent, or Firm* — KPPB LLP

(57) ABSTRACT

An adapter system for displaying and recording stereoscopic images from a single lens optic device and methods of producing stereoscopic images using such an adapter are provided herein. The adapter system utilizes an active stereoscopic shutter mounted along the optical path of the single lens optic device, such as, for example, a microscope or an endoscope, to provide a stereoscopic image to a video or still camera mounted along the same optical path.

35 Claims, 14 Drawing Sheets

(56) References Cited

U.S. PATENT DOCUMENTS

| | | | |
|---|---|---|---|
| 4,688,907 A | 8/1987 | Kleinberg et al. | |
| 4,768,049 A | 8/1988 | Barrett et al. | |
| 4,781,448 A | 11/1988 | Chatenever et al. | |
| 4,805,027 A | 2/1989 | Sluyter et al. | |
| 5,063,441 A | 11/1991 | Lipton et al. | |
| 5,222,477 A | 6/1993 | Lia et al. | |
| 5,264,928 A | 11/1993 | Howes et al. | |
| 5,471,237 A | 11/1995 | Shipp | |
| 5,828,487 A | 10/1998 | Mitchell et al. | |
| 5,835,264 A | 11/1998 | Tandler et al. | |
| 5,867,312 A | 2/1999 | Greenberg | |
| 5,914,810 A * | 6/1999 | Watts | 359/464 |
| 5,964,696 A | 10/1999 | Mihalca et al. | |
| 6,275,335 B1 * | 8/2001 | Costales | 359/464 |
| 6,624,935 B2 * | 9/2003 | Weissman et al. | 359/464 |
| 6,781,630 B2 * | 8/2004 | Nomura et al. | 348/335 |
| 6,807,295 B1 | 10/2004 | Ono | |
| 7,112,774 B2 | 9/2006 | Baer | |
| 7,170,547 B2 | 1/2007 | Uchiyama | |
| 7,621,868 B2 | 11/2009 | Breidenthal et al. | |
| 2001/0012053 A1 | 8/2001 | Nakamura | |
| 2002/0080481 A1 | 6/2002 | Tachihara et al. | |
| 2002/0141057 A1 | 10/2002 | Weissman et al. | |
| 2005/0077450 A1 | 4/2005 | Baer et al. | |
| 2005/0093891 A1 | 5/2005 | Cooper | |
| 2007/0030446 A1 | 2/2007 | Su et al. | |
| 2008/0239064 A1 | 10/2008 | Iwasaki | |
| 2008/0303896 A1 | 12/2008 | Lipton et al. | |
| 2010/0020160 A1 | 1/2010 | Ashbey | |
| 2010/0154077 A1 | 6/2010 | Emmanuel et al. | |
| 2010/0208046 A1 | 8/2010 | Takahashi | |
| 2010/0231686 A1 | 9/2010 | Goto et al. | |
| 2011/0298892 A1 | 12/2011 | Baer | |

FOREIGN PATENT DOCUMENTS

| | | |
|---|---|---|
| GB | 2168565 A | 6/1986 |
| GB | 2268283 A | 1/1994 |
| GB | 2250604 B | 5/1994 |
| JP | 09505906 A | 6/1997 |
| JP | 09215012 A | 8/1997 |
| JP | 1043126 A | 2/1998 |
| JP | 11237702 A | 8/1999 |
| JP | 2001012915 A | 1/2001 |
| JP | 2001502817 A | 2/2001 |
| JP | 2004503278 A | 2/2004 |
| JP | 2004524553 A | 8/2004 |
| JP | 2013545132 A | 12/2013 |
| WO | 9615631 A1 | 5/1996 |
| WO | 9637796 A1 | 11/1996 |
| WO | 0195791 A1 | 12/2001 |
| WO | 2012054481 A1 | 4/2012 |
| WO | 2012068137 A1 | 5/2012 |

* cited by examiner

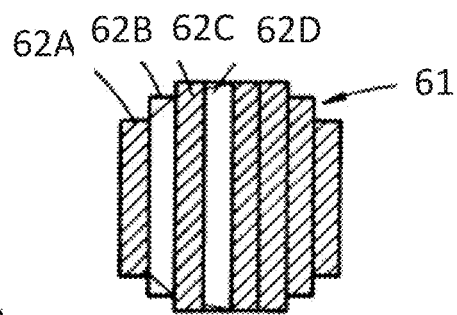
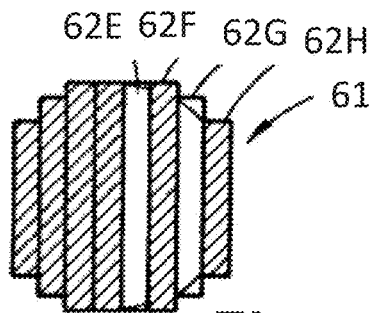
PRIOR ART
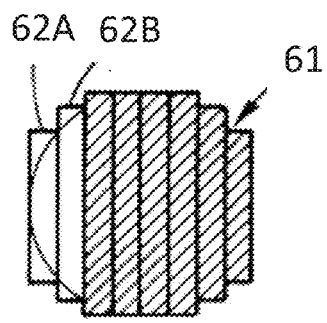
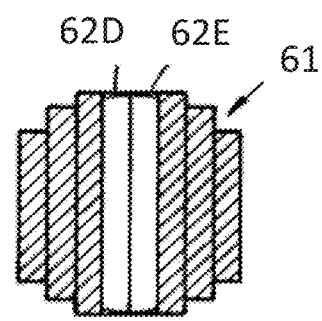
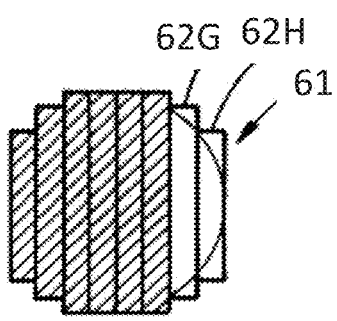
PRIOR ART

FIG. 8A
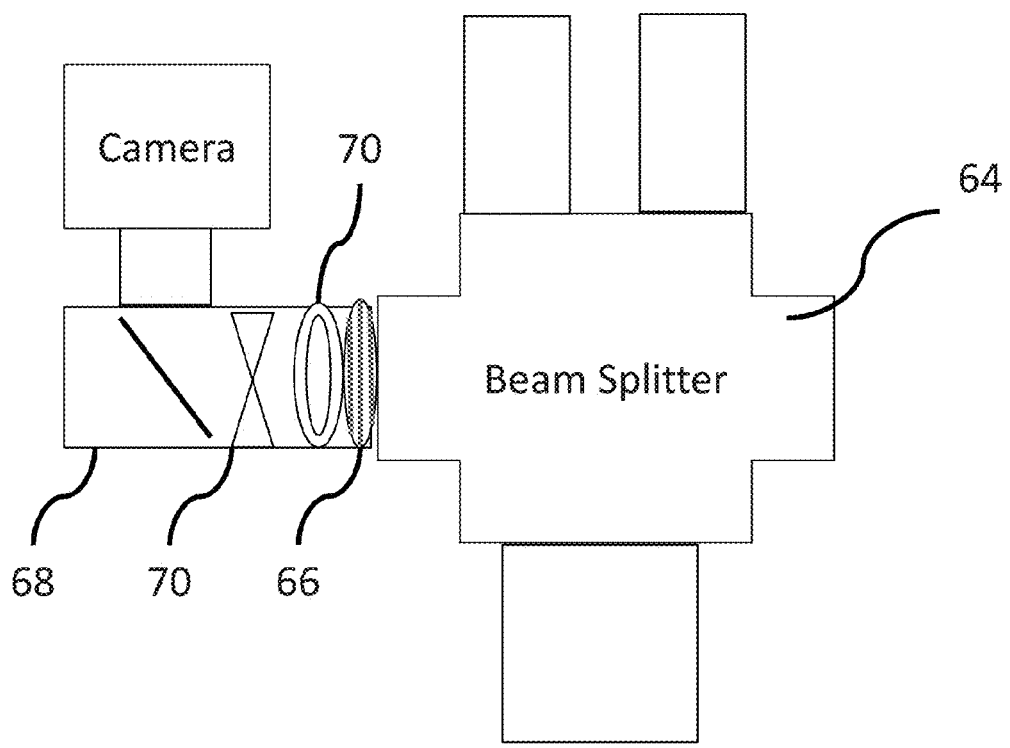
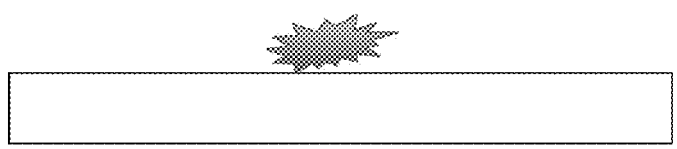

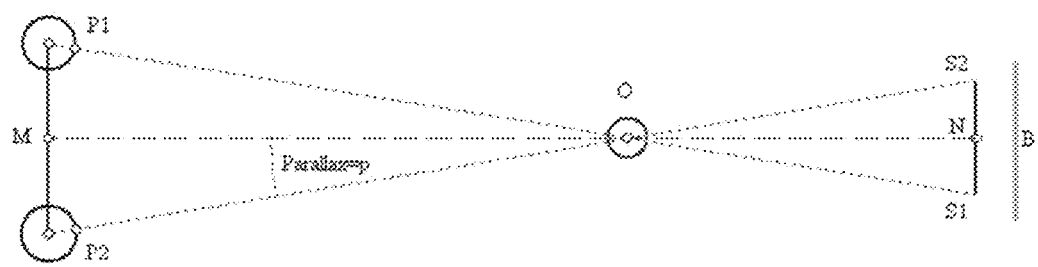
FIG. 13
FIG. 14A
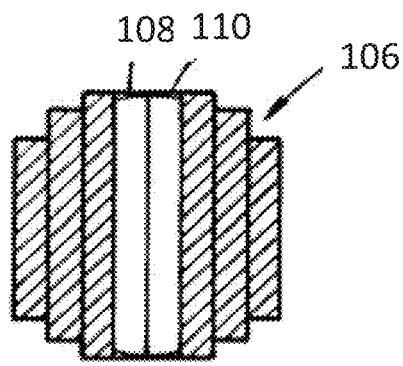
FIG. 14B
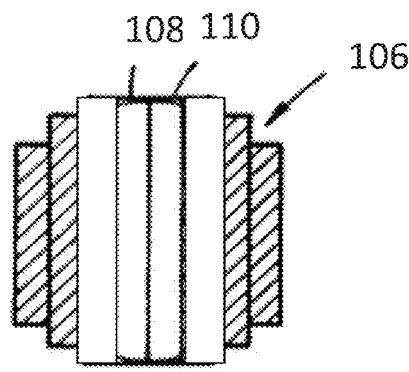
FIG. 14C
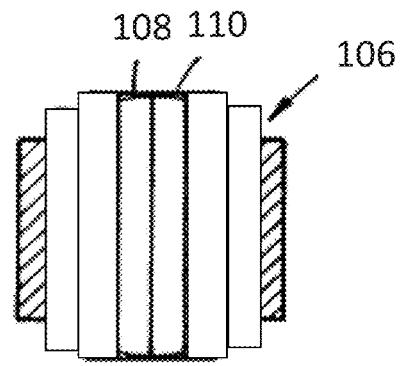

STEREOSCOPIC OPTICS

FIELD OF THE INVENTION

The present invention relates generally to stereoscopic optical equipment, and more specifically to stereoscopic optic assemblies suitable for mounting stereoscopic imaging equipment to conventional single lens optical devices, such as medical microscopes and endoscopes.

BACKGROUND OF THE INVENTION

A number of stereoscopic imaging and/or viewing arrangements are known. For example GB 606,065, which dates from 1948, discloses an arrangement for viewing scale models in stereoscopic fashion wherein a viewing tube containing an objective lens and a further lens is combined with two mutually orthogonal mirrors which divert light exiting from left and right regions of the further lens to respective eyepieces of a binocular viewing arrangement. Also U.S. Pat. No. 2,639,653, which dates from 1949, discloses a camera arrangement for taking microphotographs using a microscope, the pictures can then be viewed through a stereoscope to give a three-dimensional impression of the object. Accordingly, the fundamental optics involved in making stereoscopic images is well-known. However, applying these stereoscopic techniques to conventional optical devices such as microscopes and endoscopes in a manner that allows for the easy capture of both still and video images is significantly more complicated, and has not met with as much success as might have been expected given the time and effort devoted to these technologies.

For example, modern research microscopes frequently incorporate beam-splitting assemblies to permit additional viewing, video, and camera attachment ports. Available beam splitters come in a wide variety of configurations and can provide one or more optical attachment ports in addition to the primary viewing eyepieces. In addition, to provide even greater flexibility, some adapters are designed to permit the attachment of more than one camera to a single optical port on a microscope beam splitter. Adapters for simultaneously mounting a video camera and a 35-mm camera on one side of a surgical microscope beam splitter are shown, for example, in U.S. Pat. Nos. 4,272,161 and 4,143,938, the disclosures of which are incorporated herein by reference. Such adapters are commercially available from Carl Zeiss, Inc., and manufactured by Urban Engineering Co., Burbank, Calif.

Other prior art references describe other optical adapters that allow for the integration of video cameras, the use of automatic iris control, the integration of zoom, and the change in magnification into these optical attachments. For example, beam Splitters having integral video cameras are shown in U.S. Pat. Nos. 4,805,027 and 4,344,667; a beam splitter having three identical optical trains and four viewing stations is shown in U.S. Pat. No. 4,688,907; automatic iris control systems for use with surgical microscope adapters are shown in U.S. Pat. Nos. 3,820,882 and 4,300,167; A zoom lens adapter for an endoscopic camera is shown in U.S. Pat. No. 4,781,448; and a universal adapter that allows for the use of different focal length magnifications are shown in U.S. Pat. No. 5,264,928, the disclosures of each of which are incorporated herein by reference.

While functional and useful, such microscopic adapters generally only allow for the recording or projection of non-stereoscopic images. A recent advance in microscopy is the addition of stereoscopic imaging devices that allow for recordation of projection of stereoscopic images. The usual microscope contains a single objective lens, which functions to produce a magnified image of the subject to be viewed, and either a single ocular for viewing with a single eye, dual oculars for viewing with right and left eyes, or an access hole for recording magnified images with a still or video camera. Most of these conventional adapters only allow for observation through one optical path of the objective lens so the viewer has had no perception of depth. To address this limitation, some adapters, particularly for those used in surgical applications, have been modified to allow for stereoscopic viewing. However, most of these adapters require the use of multiple objective lenses at different optical axes, such as the device disclosed in U.S. Pub. No. 2002/0080481, or the use of a single camera that is designed to take images from multiple optical axes, such as that disclosed in U.S. Pat. No. 3,574,295, the disclosures of each of which are incorporated herein by reference. Unfortunately, any such multi-camera device is extremely complicated and expensive to produce.

Single lens stereoscopic microscopic ocular adapters have been proposed, however, to date the devices have had serious drawbacks. One class of such single lens stereoscopic microscope adapters require the use of polarizers or filters, however, such devices have been known to reduce the optical quality of the image, and often require that the viewer maintain a particular viewing angle with respect to the image. Either required polarizers or filters, both of which have significant drawbacks. Examples of such devices are provided in U.S. Pat. Nos. 3,712,199; 4,716,066; 5,835,264; 5,867,312; and 6,275,335 the disclosures of which are incorporated herein by reference. Other alternative methods require the use of active shutters, which are more costly to install, more difficult to maintain, and, when it fails, significantly degrades the optical properties of the lens. Such methods are disclosed, for example, in U.S. Pat. Nos. 5,471,237; 5,617,007; and 5,828,487, the disclosures of which are incorporated herein by reference.

Likewise, more recently stereoscopic endoscopes have been developed. In view or the size constraints on an endoscope, it is highly desirable to minimize the transverse dimensions of the optical system and for this reason many designs utilize a single objective and a beam splitting arrangement in its optical path which separates the light forming the left and right images. For example U.S. Pat. No. 5,222,477 discloses a stereoscopic endoscope arrangement wherein an aperture plate is located adjacent the objective lens of a video camera assembly in the distal tip of the endoscope. Left and right apertures of the plate are opened alternately by a shutter which is coupled to a video switching arrangement. In this manner left and right images are detected in rapid succession and are alternately displayed on a monitor screen so that they can be viewed stereoscopically by means of a pair of spectacles in which the left and right eyepieces are occluded alternately in rapid succession in synchronism with the display. Such display systems are commercially available. However the shutter arrangement has the disadvantage that it cannot easily be retrofitted to an existing monocular endoscope. Furthermore the addition of shutter components to the tip portion of the endoscope tends to increase its bulk, which is undesirable.

The provision of a beam splitting arrangement at the exit pupil of the endoscope in accordance with GB-A-2,268,283 avoids some of the above-noted problems of the arrangement of U.S. Pat. No. 5,222,477 but requires precise arrangement of the optical axis of the beam splitter with the optical axis of the endoscope and also requires that the rays exiting from the ocular of the endoscope are parallel. Furthermore the provision of a beam-splitting arrangement undesirably increases the number of reflecting surfaces and adds to the expense of the apparatus.

One solution to the persistent problem of producing a stereoscopic image from a single lens in these devices is set forth by Watts in U.S. Pat. No. 5,914,810, which splits the lens into three offset segments in a single simple shutter element. (The disclosure of the Watts patent is incorporated herein by reference. Although the Watts technology appears to offer a promising solution to single lens stereoscopic imaging, to date no attempt has been made to integrate the technology into surgical microscopes or endoscopes.

Accordingly, it would be advantageous to develop an optic adapter capable of allowing for the projection or recordation of stereoscopic images from single lens standard optical devices such as microscopes and endoscopes using a simple passive "optical shutter" that allows for the use of the entire functionality of the underlying optical device including variable magnifications.

SUMMARY OF THE INVENTION

The present invention is directed to an adapter for connecting video and/or still cameras to conventional or specially modified single-lens optic devices, such as, for example, microscopes either through a beam splitter or through an eyepiece to provide stereoscopic images, and endoscopes.

In one embodiment, the optics adapter for a microscope comprises a main body housing having an internal beam splitter oriented to receive light along an axial beam path from the conventional microscope beam splitter. The adapter beam splitter reflects portion of the axial light along a transverse beam path. The adapter further comprises a nose piece assembly detachably mounted on the main body housing and having a stereoscopic shutter disposed along the axial beam. In such an embodiment, the stereoscopic shutter may be positioned within the beam splitter, the camera mount or the nose piece either before or after the iris such that the image projected against the video/still camera is stereoscopic.

In another embodiment, the optic adapter comprises a shutter element that is incorporated into a single-lens endoscope or endoscope like device at/or near the pupil plane of an endoscope system.

In still another embodiment, the stereoscopic shutter includes means arranged to selectively occlude light exiting from left and right regions of said further lens means to form right and left images on said image plane and having means for combining said right and left images to form a stereoscopic representation of the field of view of said objective. In such an embodiment, the means for combining the right and left images may for example comprise a video processing circuit which generates a video signal representing the alternating left and right images. Such a video signal can be regarded as a stereoscopic representation in electronic form.

In still another embodiment, the shutter means comprises an array of more than two optical shutter elements distributed from left to right and means for controlling the light transmission of said optical shutter elements so as to vary the stereo base width between said right and left images. These elements may take any shape suitable for producing a change in position between the left and right images.

In yet another embodiment, the shutter means includes control means for varying the size of the unoccluded left and right regions of said further lens means to vary the width of field and/or the illumination at said image plane. Preferably said shutter means comprises a multisensitivity of shutter elements arranged to form vertical units of controllable width and/or height and separation. In one such embodiment, the width of the field is integrated with a distance detector so that the parallax of the image can be optimized.

In still yet another embodiment, the shutter and camera are positioned relative to one another to optimize the stereoscopic imaging. In such an embodiment, the shutter and camera may be interconnected such that the rotation of one results in an equal relative rotation of the other element such that the camera and shutter always maintain the proper alignment.

In still yet another embodiment, the shutter is electronically controlled such that the shutter elements may be controlled manually. In one such embodiment, the shutter may be turned off to allow for 2D viewing without modifying the device. In another such embodiment, the shutter and camera are controlled to allow for the triggering of stereoscopic still images.

In still yet another embodiment, the invention is directed to methods of projecting, recording and viewing stereoscopic images using a stereoscopic optic adapter.

In still yet another embodiment, the invention is directed to a stereoscopic optic adapter that includes an optical adapter body configured to optically interconnect a single lens optical device defining a region to be imaged and an image capture device, the optical adapter body comprising at least a stereoscopic shutter and an optical relay, wherein the stereoscopic shutter is configured to produce a stereoscopic image from the imaged region of the single lens optical device, wherein the optical relay comprises one or more optical elements configured to transmit light from said single lens optical device through said stereoscopic shutter to said image capture device, and wherein the rotational alignment between the stereoscopic shutter and the camera are fixed to ensure capture of the stereoscopic image by the image capture device.

In one such embodiment, the stereoscopic shutter is configured to alternately occlude the light exiting from predetermined regions of the single lens optical device. In another such embodiment, the predetermined regions are the left and right regions of the imaged region.

In still another such embodiment, the shutter comprises a plurality of separately controllable occludable regions. In another such embodiment, the occludable regions are formed by a device selected from the group consisting of mechanical, electromechanical, chemical and material. In still another such embodiment, the occludable regions are formed in a shape selected from the group consisting of curve, circular, hexagonal and rectangular. In yet another such embodiment, at least one of the occludable regions is fixed.

In yet another such embodiment, the stereoscopic shutter is disposed between the optical relay and the single lens optical device. In one such embodiment, the stereoscopic shutter is disposed between the optical relay and the image capture device. In another such embodiment, the stereoscopic shutter is disposed with the optical relay. In yet another such embodiment, the optical relay includes an iris. In still another such embodiment, the stereoscopic shutter is disposed within one of either the single lens optical device or the image capture device. In still yet another embodiment, the stereoscopic shutter acts as an iris.

In still yet another such embodiment, the stereoscopic shutter is incorporated within a zoom lens. In one such embodiment, the zoom lens comprises a series of converging lenses that are configured to be removably placed into optical alignment with the stereoscopic shutter to adjust the focal length of the adapter.

In still yet another such embodiment, the adapter is removable interconnected between the image capture device and the single lens optical device. In one such embodiment, the adapter is integrated within the image capture device. In another such embodiment, the adapter is integrated within the single lens optical device.

In still yet another such embodiment, the light entering the stereoscopic shutter has one conjugate that is approximately infinite. In one such embodiment, the optical relay is located adjacent to the exit pupil of the single lens optical device.

In still yet another such embodiment, the single lens optic device is one of either a microscope or an endoscope.

In still yet another such embodiment, the image capture device is selected from the group consisting of mechanical still cameras, digital still cameras, CCDs, CMOSs, digital video camera, and light field capture systems.

In still yet another such embodiment, the adapter utilizes the entire area of the lens of the single lens optic device.

In still yet another such embodiment, at least one of the stereoscopic shutter and image capture device are mounted on adjustment stages configured to allow the rotational alignment of the stereoscopic shutter in relation to the image capture device. In one such embodiment, both the stereoscopic shutter and image capture device are mounted on rotational adjustment stages configured to allow the rotational alignment of the stereoscopic shutter in relation to the image capture device, and wherein the adjustment stages are interconnected such that rotation of one of either the stereoscopic shutter or the image capture device causes an equivalent rotation in its counterpart.

In still yet another such embodiment, the adapter comprises a programmable controller circuit to control the operation of the stereoscopic shutter. In one such embodiment, the shutter comprises a plurality of separately controllable occludable regions configured to alternately occlude the light exiting from predetermined regions of the single lens optical device, and wherein the programmable controller circuit controls the operation of each of the occludable regions. In another such embodiment, the programmable controller circuit is in further signal communication with the image capture device, and is configured to synchronize the image capture device with the opening and closing of the stereoscopic shutter to ensure stereoscopic viewing. In yet another such embodiment, the programmable controller circuit is configured to disable the stereoscopic shutter such that the adapter can be reconfigured into a non-stereoscopic device. In still yet another such embodiment, the programmable controller circuit is configured to examine the shadow formed in the stereoscopic image, and to optimize the operation of the stereoscopic shutter for optimum stereoscopic imaging. In still yet another such embodiment, the image capture device has a rolling shutter, and wherein the programmable controller circuit is configured to synchronize the stereoscopic shutter with said rolling shutter. In still yet another such embodiment, the adapter further comprises at least two image capture devices, and the programmable controller circuit is configured to synchronize the two image capture devices to capture a single still stereoscopic image. In still yet another such embodiment, the programmable controller circuit is configured to allow for the conversion of data from the image capture device to a stereoscopic video output in a format selected from the group consisting of frame sequential, progressive, interlaced, side by side, checkerboard and horizontal interleave/line by line. In still yet another such embodiment, the adapter further comprises a pulsed light and wherein the programmable controller circuit is configured to synchronize the stereoscopic shutter with the pulsed light to allow for the capture of high speed motion capture by the image capture device. In still yet another such embodiment, the programmable controller circuit is configured to center the stereoscopic shutter position with the optical axis of the single lens optic device. In still yet another such embodiment, the programmable controller circuit is configured to determine the parallax of the image captured by the image capture device.

In still yet another such embodiment, the stereoscopic shutter is electronic and the stereoscopic effect is generated via image signal processing.

BRIEF DESCRIPTION OF THE DRAWINGS

These and other features and advantages of the present invention will be better understood by reference to the following detailed description when considered in conjunction with the accompanying drawings, wherein:

FIGS. 6A and 6B are schematics of a stereoscopic shutter in accordance with the prior art;

FIGS. 7A to 7C are schematics of another embodiment of a stereoscopic shutter in accordance with the prior art;

FIGS. 8A to 8D are schematics of a series of embodiments of stereoscopic camera mounting adapter systems in accordance with the current invention;

FIG. 13 is a schematic of the parallax phenomenon; and

FIGS. 14A to 14C are schematics of another embodiment of a stereoscopic shutter in accordance with the current invention.

DETAILED DESCRIPTION OF THE INVENTION

The current invention is directed to a stereoscopic adapter for connecting video and/or still cameras to conventional single lens optic devices, such as, for example, microscopes or endoscopes to provide stereoscopic image recordation or projection of viewed images. In particular, the current invention modifies a stereoscopic optic adapter to allow for the incorporation of the stereoscopic image capture technology of the Watts patent (U.S. Pat. No. 5,914,810) into conventional single-lens optic devices such as microscopes and endoscopes. Although the current invention may be applied to any number of optic devices, the following discussion will focus on two implementations of the invention, a microscope and an endoscope.

Overview of Conventional Microscope Video/Camera Adapters

Figure 1:
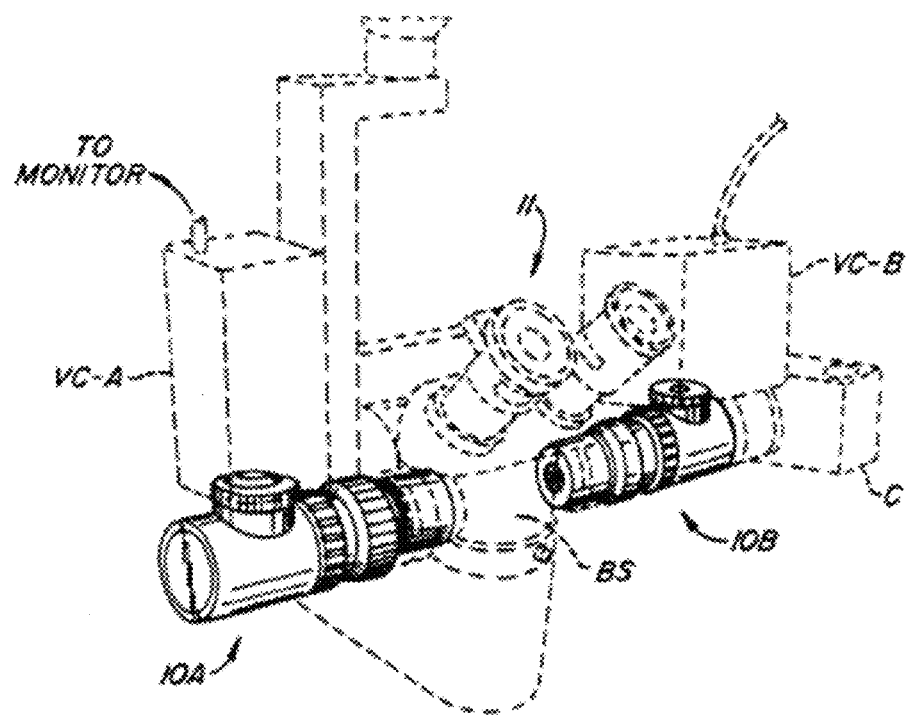
FIG. 1 is a perspective view illustrating a pair of conventional camera mounting adapter systems in accordance with the prior art.

A conventional video/still camera microscope adapter system is illustrated in FIG. 1. As shown, a conventional video adapter system allows for a pair of cameras or other optical devices 10 to be mounted on a single microscope beam splitter assembly (BS). The video adapter may be mounted to any conventional microscope and beam splitter assembly available from commercial suppliers, such as, for example, Carl Zeiss, Inc. In FIG. 1, a first video adapter system 10A has a video camera VC (shown in phantom) mounted thereon, while the second video adapter system 10B has both a video camera VC (shown in phantom) and a still camera C (also shown in phantom) mounted thereon. As will be discussed in detail below, these conventional video adapter systems 10 include a number of components which permit the selection of a variety of features to permit mounting of different video and/or still cameras, providing for different focal length magnifications and permitting the interconnection of a variety of equipment from different manufacturers to the microscope and beam splitter.

Figure 2:
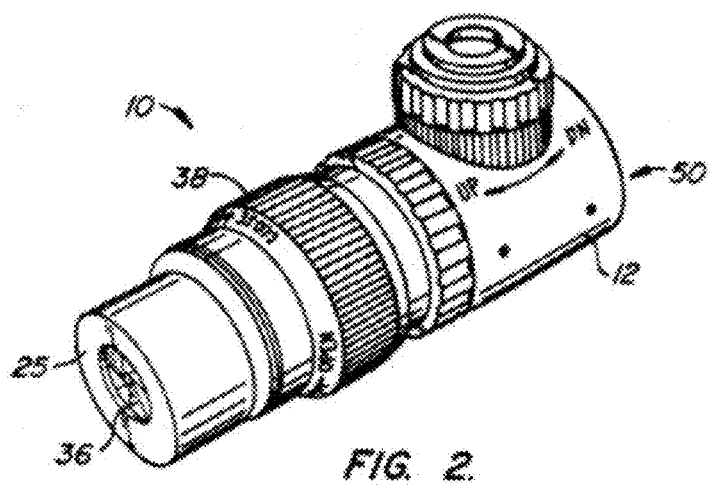
FIG. 2 is a perspective view of a conventional camera mounting adapter system in accordance with the prior art.
Figure 3:
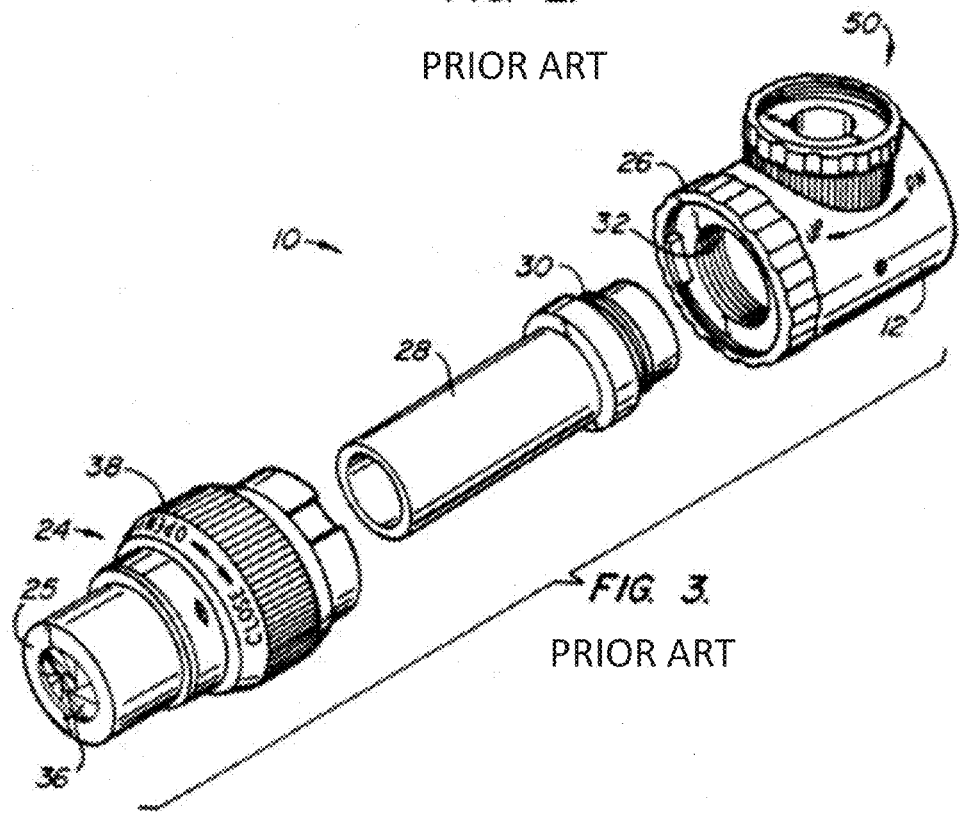
FIG. 3 is an exploded view of a conventional camera mounting adapter system in accordance with the prior art.
Figure 4:
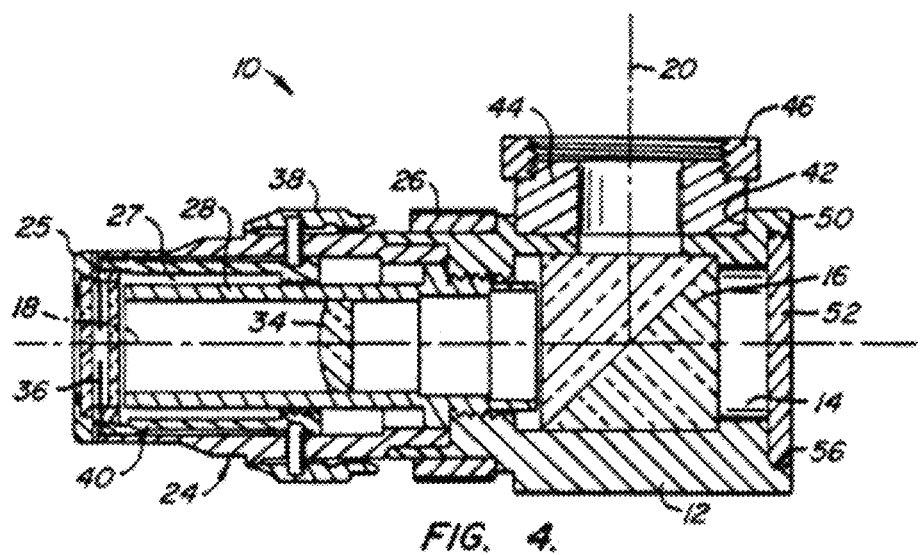
FIG. 4 is a cross-sectional view of a conventional camera mounting adapter system in accordance with the prior art.

Referring now to FIGS. 2-4, the basic construction of a conventional video adapter system 10 will be described. The essential components of any video adapter system include a main body housing 12, which defines an axial passage 14 which holds a beam splitter 16. Although as shown the beam splitter comprises a pair of opposed prisms, it should be understood that any device for reflecting and/or partially reflecting an axial beam of light 18 from the microscope objective lens moving along the beam path 20 may be used in these devices, including a single prism, a partially reflective mirror, a pivotable mirror, or any equivalent structure.

Although non-essential to the operation of the video adapter, most conventional designs also include a nose piece assembly 24, which can be detachably secured to a proximal end of the main body housing 12 through a mechanism such as a conventional locking ring 26. The nose piece assembly 24 also includes an axial passage 27 which is aligned with the axial passage 14 in the main body housing 12 when the nose piece assembly, is secured to the main body housing. As shown in these figures, the nose piece assembly 24 further may include an adjustable iris 36 mounted at the end of the nose piece. This iris may be adjusted using adjustment ring 38 which may be connected to the iris by any conventional linkage assembly including a barrel such as that shown by element 40 in FIG. 4. Alternatively, the video adapter system may further comprise a motorized iris control mechanism to automatically control the iris 36 from commands received from an external device, such as, for example, a remote light sensor (not illustrated) which may be mounted within the video camera.

The video adapter may also include a lens cartridge 28 for focusing or otherwise altering the optical characteristics of the light 18 prior to reaching the video or still camera. The lens cartridge 28 (FIG. 4) is essentially a hollow tube having a single or a complex lens or series of lenses mounted therein. The optics and axial position of the lens 34 within the cartridge 28 may be varied in order to obtain different focal length magnifications for the attached camera or cameras. To this end, in the embodiment shown, the lens cartridge is removably attached to the main body housing 12 by a threaded connector 30, which is received in a threaded receptacle 32 in the housing, however, it should be understood that the lens may be attached into the housing by any suitable means, and may be fixed in place if there is no need to change the lens.

Turning now to the video and camera mounting receptacles, as shown in FIGS. 1 to 4, in these conventional designs a video mount receptacle 42 is formed in the main body housing 12 and receives a video mounting and focus assembly comprising base 44 and locking ring 46, as illustrated particularly in FIGS. 3 and 4. The locking ring 46 may be adapted to receive any suitable camera connector, including both a C-mount ring and a bayonet-type mount ring.

As illustrated in FIGS. 2-4, the video adapter system 10 terminates in a receptacle 56, which is shown with dust cover 52 in place in FIGS. 1 and 4. In order to attach a still camera, the dust cap 52 will be removed and replaced with a lens holder assembly 54 (FIG. 4A) which can be threadably inserted into a receptacle 56 formed in the main body housing 12. Any suitable single or compound lens may be replaceably mounted in the lens holder assembly 54 so that it will lie on the axial beam path 18 on the side of the beam splitter remote from the nose piece assembly 24. The lens holder assembly 54 could also include means on its proximal end for securing another still camera body, typically via a threaded receptacle. The nature of the receptacle, of course, will depend on the type of camera mount, and the adapter system 10 may include any number of lens holder assemblies 54 in order to accommodate different cameras.

Regardless of the method of interconnection the lenses will be selected to be optically compatible with the lens cartridges 28 disposed in the nosepiece 24, as described previously. In short, the lenses associated with the video camera VC and the still camera C can be independently selected to provide different focal length magnifications for each camera.

Overview of Conventional Endoscopic Optics

Figure 5:
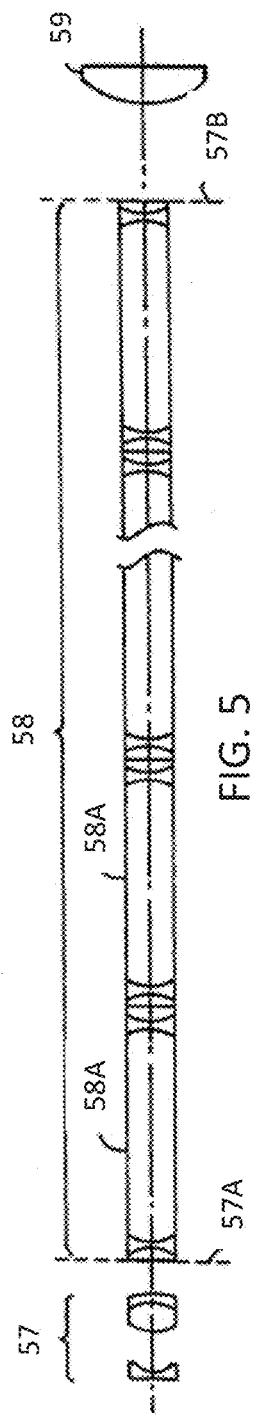
FIG. 5 is a cross-section view of a conventional endoscope in accordance with the prior art.

A conventional optical arrangement for an endoscopic is provided in FIG. 5. As shown, in a conventional single lens endoscope the optic system comprises an objective 57 for forming an image in a first image plane 57A, an optional relay system 58 for transmitting an image in plane 57A to a second image plane 57B, and an eyepiece 59 for viewing the transmitted image. Objective 57 and transfer system 58 occupy a relatively small diameter barrel which is typically surrounded by an annular fiberoptics bundle. A typical diameter of the lenses is about 2.5 mm.

In use, the endoscope is inserted within a body cavity or the like by a physician for viewing of internal body regions. Objective 57 forms an image of the region to be viewed at first image plane 57A, which image is transmitted by relay system 58 to second image plane 57B proximate eyepiece 59 for direct viewing by the physician or communication to a television camera. In the various embodiments to be discussed below, the optional relay system 58 may comprise a plurality of cemented five-element assemblies 58A. Assemblies 58A are arranged in pairs, with each pair providing a transfer module (i.e. a module which transfers an image from one plane at the front of the module to a second plane at the rear of the module). Using such an optical scheme it is possible to transmit the view at the remote end of the endoscope to the proximal end of the endoscope where the viewer is positioned.

Overview of the Watts Stereoscopic Technology

Although the above discussion focused on the structure and function of conventional single lens optical devices, including a microscope adapter and an endoscopes, the current invention is directed to a stereoscopic optical adapter that modifies the structures of the prior art adapter to incorporate the stereoscopic imaging technique of Watts, set forth in U.S. Pat. No. 5,914,810, disclosed above. Before the novel microscope mount can be described in detail, an explanation of the Watts stereoscopic imaging method is required.

The core of the Watts method is the provision of a novel stereoscopic shutter 61, shown schematically in FIGS. 6A to 6B and 7A to 7C. The shutter is arranged to alternately occlude the light exiting from the left and right regions of an ocular preferably at a rapid rate (such as 60 times per second for video, although it should be understood that any suitable rate can be used where the higher the rate will provide superior properties), under the control of a signal from a dedicated video processing circuitry. The shutter is composed of separately controllable regions, which are formed by a mechanical, electromechanical, chemical or material means capable of rapid switching, such as, for example, a liquid crystal material. In the embodiment, shown in FIGS. 6 and 7, these regions are composed of vertical strips 62*a* to 62*h*, which can be individually controlled by signals from the control circuitry. For example, in FIG. 6A, when the left-hand image is formed elements 62*a* and 62*b* would opened. At the instant the shutter switching signal is generated, these shutter elements are closed and shutter elements 62*e* and 62*g* are then opened as shown in FIG. 6*b*, allowing the right-hand image to be formed.

The above sequence is repeated at a rapid rate, such as, for example, at 24 image pairs per second. Although vertical strip are used as an example above it should be understood that he shutter may be divided into cells of any shape, size or dimension, provided the cells are capable of selectively occluding different vertical regions of the shutter. For example, rather than being straight the individual elements of the stereoscopic shutter maybe curved, circular, hexagonal, etc. In addition, although all of the individual elements of the shutters described above are formed from similar electromechanical or mechanical elements, it should be understood that the shutter might be made of a mix of these elements. For example, in one embodiment, the middle shutter element might be fixed or mechanical, while the side elements would be electrically controllable elements, such as, LCD elements.

By controlling the number of shutter elements open at each exposure, the illumination and/or depth of field can be controlled and the conventional iris 36 (FIG. 2) can be dispensed with. For example, if only shutter element 62*c* were opened to form the left-hand image and only shutter element 62*f* were opened to form the right-hand image the f-number of the aperture would be increased relative to that shown in FIG. 6 and hence the illumination would be reduced and the depth of field increased.

The stereoscopic separation between the left-hand and right-hand images can also be varied by adjusting the separation between the shutter element(s) opened to form the left-hand image, and the shutter element(s) opened to form the right-hand image. For example, the separation could be increased by opening elements 62*a* and 62*b* to form the left-hand image, and elements 62*g* and 62*h* to form the right-hand image. In this manner the exposure and stereoscopic separation can be varied independently. It is also possible to divide the shutter elements in the vertical direction and thereby enable further control of the aperture size and location to be obtained.

During operation, video processing circuitry generates a video signal representing the alternating left and right images originating from the left and right portions of the field of view of and transmits this video signal to a stereoscopic monitor or other stereoscopic viewing device, which displays the left and right images alternately, each at the same rate. The user can then view the image on the screen using spectacles designed for use with the viewing device of choice.

FIG. 7 shows another mode of operation of the above stereoscopic shutter element 61. In this embodiment, the video circuitry would be programmed to generate a three-state switching signal, which would successively cause shutter elements 62*a* and 62*b* to open to form the left-hand image (FIG. 7*a*), shutter elements 62*d* and 62*e* to open to form a central image (FIG. 7*b*), and shutter elements 62*g* and 62*h* to form a right-hand image (FIG. 7*c*). A corresponding three-state switching signal to the viewing device to sync that device to the incoming image. Although this mode of operation slightly compromises the stereoscopic effect, it increases the average illumination and reduces flicker thereby improving overall image quality in some cases.

Stereoscopic Optic Adapters

The current invention provides a system for incorporating a stereoscopic shutter such as that described above, with a conventional video/still camera adapter for any conventional single lens optical device, such as, for example a microscope or an endoscope. Schematics of several alternative configurations of the inventive adapter configured for use in a microscope (FIGS. 8A to 8D) and an endoscope (FIG. 9) are discussed below.

Figure 8B:
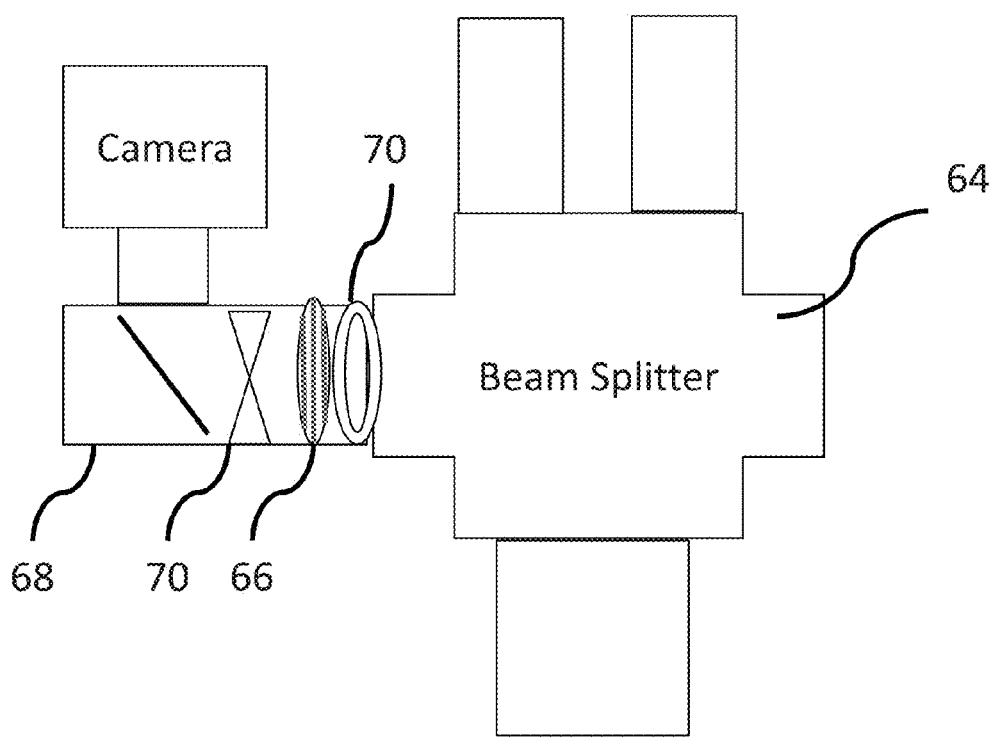
Figure 8C:
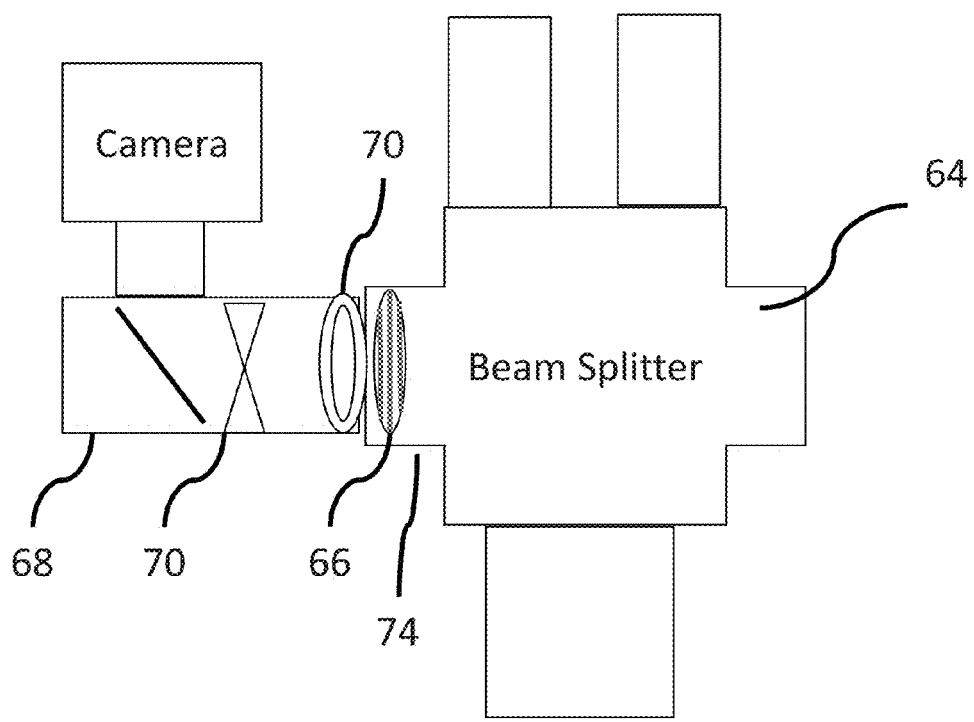
Figure 8D:
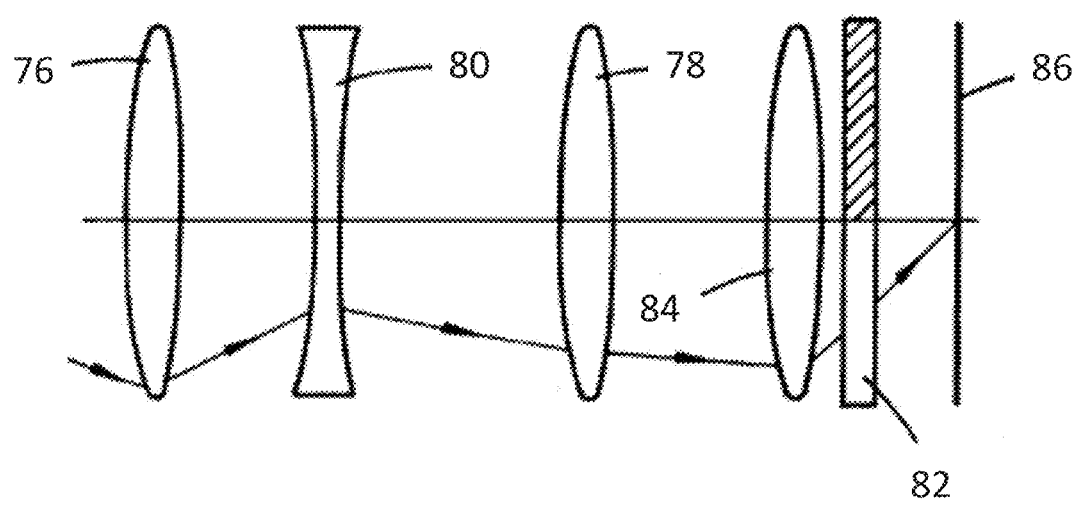

As shown in FIGS. 8A to 8C, in the invention the shutter may be incorporated into the microscope 64 in a number of different configurations. For example, the stereoscopic shutter 66 may be positioned within the camera adapter lens assembly 68 either in front of lenses 70 and iris 72 (FIG. 8A), or behind the iris and between different lens elements of a multi-element lens (FIG. 8B). Alternatively, the shutter may be placed within the camera/video port 74 of the microscope 64 itself before the microscope adapter lens assembly 68 (FIG. 8C).

It should be understood that these are only some exemplary configurations, the number of lenses in the lens adapter may be changed to suit the specific arrangement of optical devices. For example, the stereoscopic shutter might be incorporated with a zoom lens. In such an embodiment, as shown schematically in FIG. 8D, a converging lens 76 would be linked by a standard mechanical/electromechanical linkage (not shown) to a further converging lens 78 to enable the focal length to be adjusted. An intermediate diverging lens 80 is provided and the shutter 82 which may be as shown and described above with reference to any of FIGS. 6 and 7, for example is mounted behind a further converging lens 84, where the iris would normally be located. The image is then focused as normal on a video/still camera 86. In a preferred embodiment, the shutter assembly is disposed between the rod lenses for optimal placement.

In addition, non-essential aspects of the device may be omitted. For example, as described above the stereoscopic shutter can operate as an iris thereby removing the need for a second iris.

These various configurations each have different advantages. For example, keeping the shutter within the adapter allows the endoscope to function like a standard endoscope or a stereoscopic endoscope by simply moving the adapter into or out of alignment with the endoscope. In addition, by linking the adapter and camera it is possible to rotate the scope while holding the camera, which is very important especially with angled scopes (i.e., 30 degree DOV). Moreover, in such an embodiment, the scope can be replaced with a standard eyepiece connector, which is important if there is a need to switch the angle of the scope in the middle of a procedure (i.e., from a 0 degree scope to a 70 degree scope), or if the scope breaks down during the procedure. Finally, when the shutter is not located in the scope, but in the camera coupler the cost is reduced because standard instruments may be used, it allows the scope to be rotated independently of the shutter, it allows the scope to be sterilized without any concern of damaging the shutter, and it keeps all of the electronics and cables in the coupler. Similar advantages may be obtained by permanently integrating the shutter into the camera head. In such a case the shutter and coupler may be aligned during manufacture and permanently attached/integrated, although obviously this requires a special purpose camera.

Figure 9:
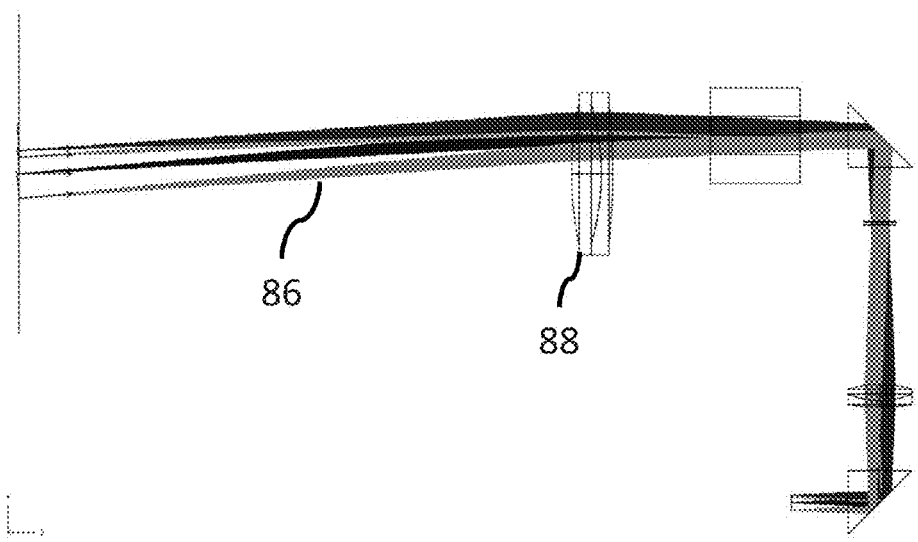
FIG. 9 is a schematic of a ray diagram of an embodiment of a stereoscopic camera mounting adapter system in accordance with the current invention.
Figure 10:
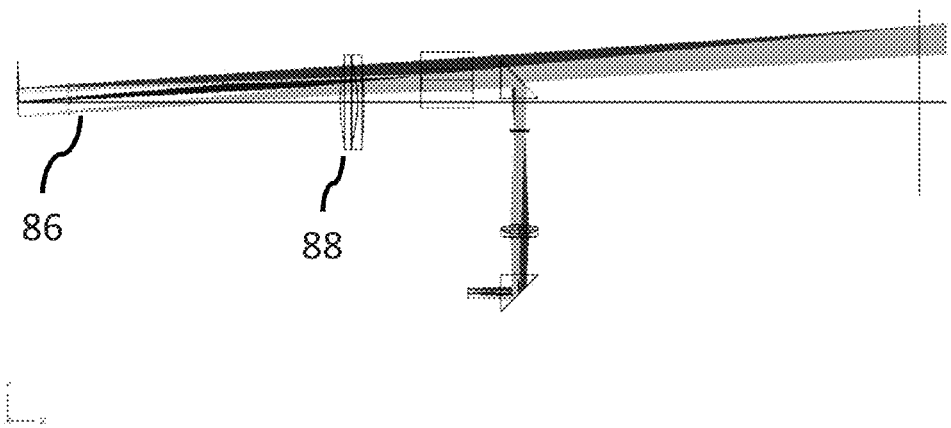
FIG. 10 is a schematic of a ray diagram of another embodiment of a stereoscopic camera mounting adapter system in accordance with the current invention.

Regardless of the position of the stereoscopic shutter or the specific optics incorporated into the adapter and microscope, it is important that the optics of the adapter and the camera mount be aligned and chosen to ensure that the stereoscopic image reaches the video/still camera without distortion and in the proper configuration. FIGS. 9 and 10 show schematics of ray tracings showing the operation of two different lens/shutter configurations. As shown, preferably the rays 86 blocked by the shutter 88 are parallel as shown but may alternatively converge or diverge. This is particularly important if the shutter is incorporated into the camera coupler optics/adapter. Parallel rays are the ideal location for the shutter as this pupil plane contains the full image information. Accordingly, in a preferred embodiment the ocular lens is designed to provide light coming out of the endoscope where the conjugate is nearly infinite. In such a nearly infinite conjugate system the lens system may be placed at that exit plane or pupil of the endoscope, so the light is as close to the shutter as possible. A system with an infinite conjugate or nearly infinite conjugate allows for the distances between the endoscope and the coupler to be varied, and makes it easier to keep the optical system aligned. If, in contrast, the rays are converging, the shutter is preferably located close to the lens.

In addition, such an embodiment is the ideal way to remove the endoscope and have a traditional endoscope but include new technology. For example, it is possible to provide an adapter for existing endoscopes to collimate the rays exiting for the scope eyepiece. Various adapters may be constructed for use with various makes and models of endoscopes have various exit angle or eyepiece magnifications. For example, if an endoscope is provided where the light rays are diverging 10 degrees is put behind an adapter lens that ensures that the system conjugate is nearly infinite then it is possible to use the coupler of the instant invention regardless of that angle. It should be understood that such an adapter may either be separate or be designed into the endoscope.

More particularly, in FIG. 9, a non-sequential model of a Zeiss microscope is provided. In this model the objective lens is 175 mm×50 mm diameter, the CCD Lens is 55 mm FL×20 mm diameter, the turret is 12 mm off-axis. The axial field point (blue) angle is adjusted to go through center of shutter and CCD Lens. The marginal Fields points (Red and Yellow) are translated to fill ⅓ in CCD. The long dimension of the CCD is in the same axis as stereo channels (y-axis). The angles of all the field points are adjusted to pass through the center of the shutter. The maximum shutter diameter is 5.5 mm for 100% efficient atop. In FIG. 10, the location of the entrance pupil is 486 mm from the object. The separation of the Channels at the turret is 24 mm, while the separation of the channels at the entrance to the pupil is 66 mm. The image of the shutter at the entrance pupil is 15.4 mm dia. (Ms=15.4/5.5=2.8X).

The results of these optic simulations demonstrate that, although stereoscopic images may be obtained from any conventional microscope using the inventive adapter, the larger the diameter of the objective lens or pass-through used in the microscope the better the stereoscopic effect will be. In particular, traditional endoscopic design does not maximize stereoscopic view. For example, in a traditional endoscope a lens having a diameter of 6.5 mm may only use a 4.5 mm diameter section of lens. The drawback is that if the light is bent, it might cause vignetting (a reduction of an image's brightness or saturation at the periphery compared to the image center). However, as demonstrated by the simulations, the entrance pupil of the system is important for maximizing the stereo effect. The reason for this difference in implementation between traditional and stereoscopic endoscopes is based on their purpose. In traditional endoscopes, the use of smaller entrance diameters allows for better depth of focus. However, the use of larger entrance diameters provides a bigger area providing an improved apparent inner pupil diameter, which greatly improves stereoscopic effect and light transmission (brightness), neither of which are critical for non-stereoscopic endoscopes. Accordingly, in one preferred embodiment, the objective lens of the stereoscopic endoscope system is designed to maximize the use of the lens.

In addition, traditional endoscopic optical designs are optimized for the center of the optical system. Likewise, conventional single lens stereoscopic systems that utilize shutters block the center, so better optical performance can be achieved when they are designed to be optimized at 70% of the edge of the optical path. In the current invention, the shutter always blocks a portion of the central portion of image. By increasing this blockage it is possible to look at the edges more and more, expanding the apparent inner pupil diameter. Using the multi-component shutter of the instant invention it is possible to move the occlusion about so that by using such a weighted design best image quality at 70% of center can be achieved.

Figure 11:
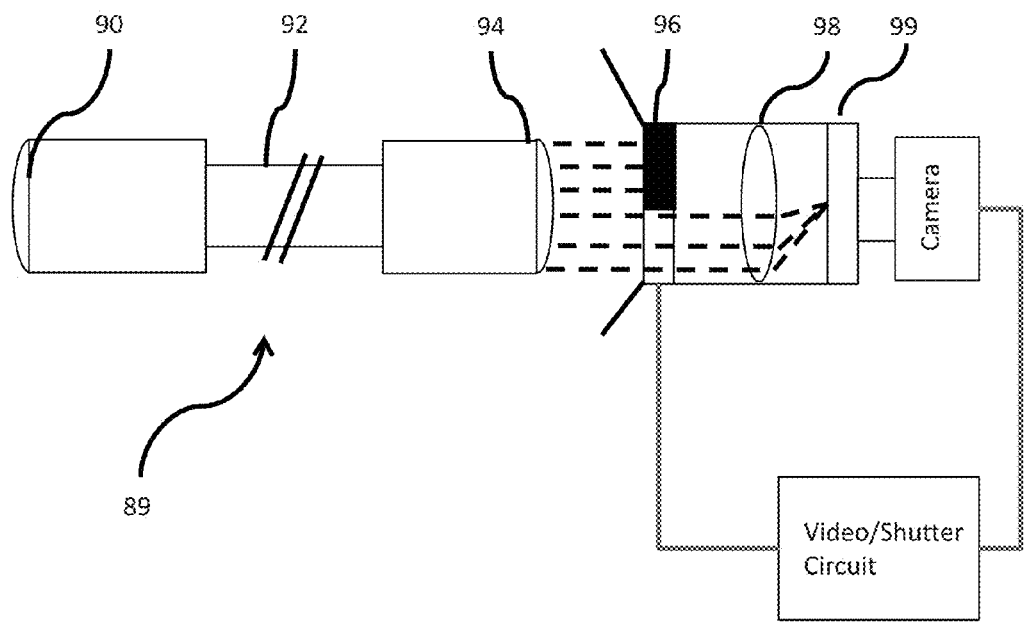
FIG. 11 is a schematic of an embodiment of a stereoscopic endoscope in accordance with the current invention.

Turning now to the integration of the optics adapter of the present invention into an endoscope, a schematic of an exemplary embodiment is provided in FIG. 11. As shown, in this embodiment of the invention, a conventional monocular rigid endoscope 89 having an objective lens 90 at its distal tip and an ocular 94 at its proximal end is optically coupled to a camera (shown schematically), which focuses light exiting from a further lens means, namely an ocular 94 onto the optics 99 of the camera by means of a focusing lens 98. It will be appreciated by those skilled in the art that in practice lens 98 will normally be a multi-element lens and that the exposure will normally be controlled by an iris (not shown). As described thus far the arrangement is conventional. Alternatively the camera may be a video or still camera, in which case the light from lens 98 is focused onto the photosensitive image plane of the video or film camera.

In accordance with the invention a shutter 96 is provided which is arranged to alternately occlude the light exiting from the left and right regions of the ocular 94 preferably at a rapid rate such as 60 times per second or higher (for video), under the control of a signal from video processing circuitry. The shutter 96 may be provided in front of lens 98 as shown, between different lens elements of a multi-element lens 98 (not illustrated) or may be located between the lens 98 and the camera, for example. In particular, the shutter may either be mechanical or electronic, such as an LCD shutter printed on a surface of lens 98. The rays blocked by shutter 96 preferably are a nearly infinite conjugate, as shown, but may alternatively converge or diverge. Particularly if the rays are converging, the shutter should preferably be located close to the lens.

It should be understood that although the above embodiment is described in relation to an endoscope, the optic adapter may also be applied to a laparoscope, a boroscope, a cystoscope or an arthroscope, for example. In addition, as will be discussed later, the user may pull focus or zoom (assuming the lens has this facility) without affecting the stereoscopic imaging.

Figure 12:
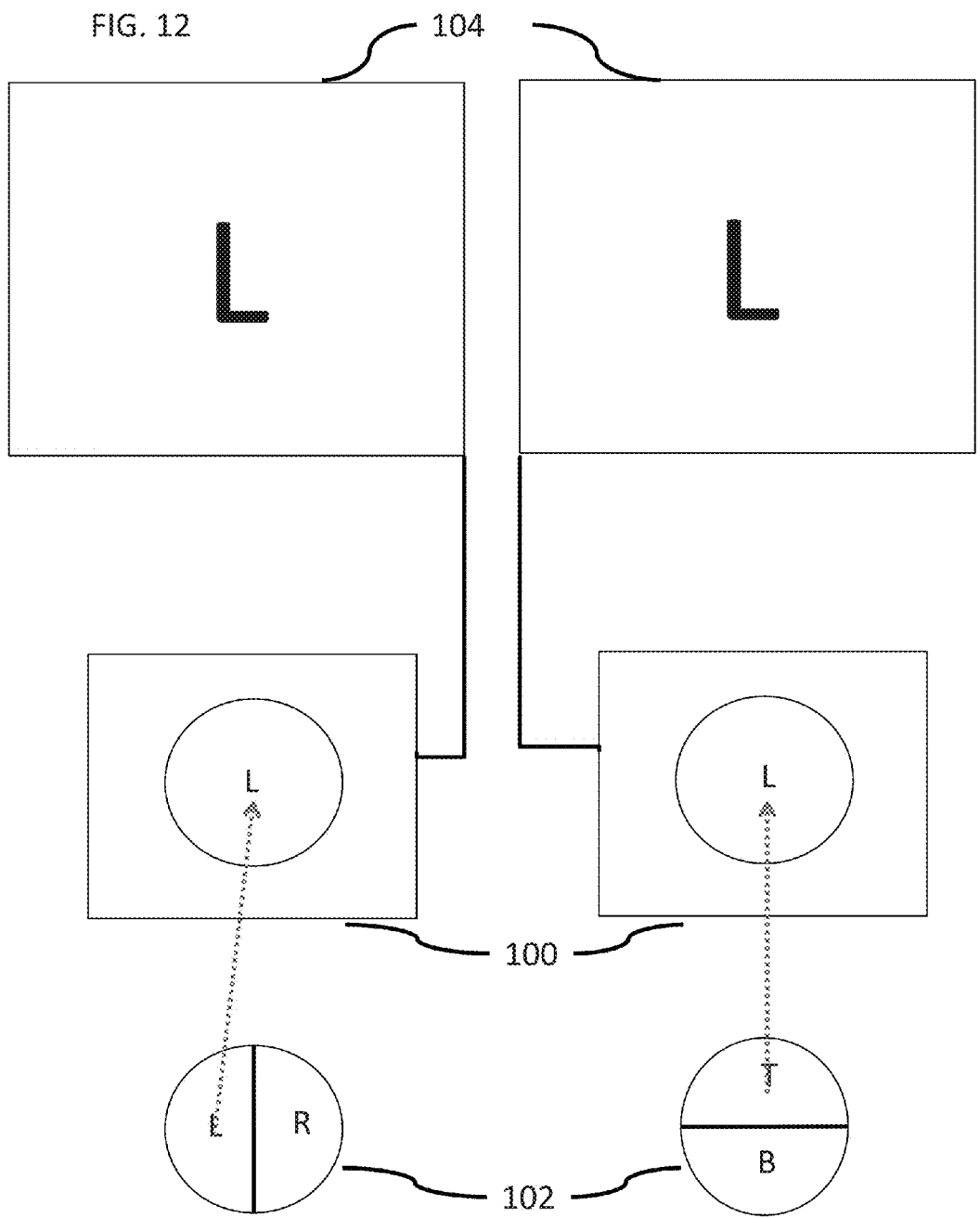
FIG. 12 is a schematic of the synchronization between the camera and stereoscopic shutter in accordance with the current invention.

Regardless of the actual type of single lens optical device the stereoscopic optic adapter of the invention is incorporated into, it should be understood that specific structural constraints need to be taken into consideration. For example, in normal single lens devices, it is possible to alter the position of a projected image on a screen by simply rotating the camera or camera adapter. Obviously any such rotation of the camera or camera adapter is translated on the viewing screen, thereby allowing for the observer to modify their angle of viewing without moving or rotating the specimen (which in surgical cases might be the body of the patient). However, this manner of manipulating the viewing angle of an observed object is complicated in the current invention. In particular, because it is necessary for the video display to be in sync with the shutter so that it can toggle between left and right views to produce a stereoscopic effect, the orientation of the shutter and the camera relative to each other must remain fixed. If the orientation of the camera or shutter relative to each other is changed, the video display will not "know" whether the image being transmitted to it is from the right or left portion of the shutter, and the stereoscopic effect will be destroyed or degraded. FIG. 12 provides a schematic showing how a change in the relative orientation of the camera and the shutter can affect the stereoscopic image on the screen. In view A the camera 100 and shutter 102 are properly aligned, so that as the shutter switches between left and right views the camera is transmitting those images to the screen 104 in the proper orientation. However, in view B, the shutter has been rotated 90 degrees so that there are "top" and "bottom" views. However, the camera has not been rotated, so the display still displays the top orientation as a left orientation. The result being that the stereoscopic effect is destroyed for the observer.

Accordingly, in one embodiment of the invention, the stereoscopic shutter and camera are disposed on the adapter on independently rotatable connections, such as any suitable type of manual or automated adjustment ring that allow for the appropriate orientation of the shutter and camera. Once the shutter and camera are oriented as appropriate, they are then interconnected via a mechanical or electromechanical linkage such that rotation of one of the shutter or camera results in an equal rotation of the other of the shutter or camera in the same direction and with the same degree of rotation. Using such a synchronized interconnection provides a user with the possibility of changing the orientation of the viewed objected without degrading or destroying the stereoscopic effect and also without the requirement of moving the object being viewed. For example, using such an interconnection allows the shutter and optic to move when the optics in the coupler are moved to focus the image. The ability to focus properly without disrupting the orientation of the camera and shutter is important because otherwise the stereoscopic alignment will be destroyed. Configuring such focus synchronization requires extra engineering because of the sealing on the endoscope. In particular, traditional endoscopes have two windows on the outside that hermetically seal the lens on the inside, then there is a cam mechanism with a knob that drives the lens forward and backward to adjust the focus. On more complicated zoom mechanisms there is an adjust zoom that moves a set of optics into place to increase the magnification and another ring that adjusts the focus. There is going to be an optimal position at which the shutter should be located in relation to such optics. Accordingly, there is a need to fix that position so when the optics are focused it is at the proper spot. For a simple focus it is possible to simply fix the position between the shutter and lens and move the entire whole system, but in a device with a zoom it is also necessary to cam the shutter so it moves in and out of place with the zoom lens. One exemplary autoclavable system in which the movement takes place outside the hermetically sealed device can be found in U.S. patent application Ser. Nos. 68/55106 and 63/98724, the disclosures of which are both incorporated herein by reference.

It should be understood that a programmable circuit device (not shown), which controls the operation of the stereoscopic shutter is also provided with the optic adapter. This circuit device controls the transition of each of the shutter elements from the transmissive to opaque state as well as the transition of the shutter elements from the opaque to transmissive to state. This circuit device can also be interconnected with the camera and/or the video display device to synchronize the visible video portion of each video frame with the shutter.

The presence of such a controllable electronic device, in combination with the active stereoscopic shutter of the invention allows for a great deal of flexibility in the operation of the stereoscopic optics. For example, using the shutter control circuit device it would be possible for a user to perform a number of unique functions:

The stereoscopic shutter control technology allows for the shutter to be turned on and off instantaneously. This allows for an instantaneous transition between 3D and 2D views without requiring any changes to the lens, shutter or adapter.

It is also possible to embed a sync circuit so that the user can control the left and right fields to align them with the appropriate odd and even frames of the camera. This circuit can either allow for manual control of this sync or to automatically sync the L/R views to the particular camera requirements.

Using the stereoscopic shutter control technology it is also possible to sync the processing/timing of the video with the shutter and the shutter to camera such that it is possible to ensure that all three elements (shutter/camera/video display) are all synched to show the same L/R views and to switch these elements if they become unsynched at any time.

An alignment feature may be built into the shutter driver to verify the correct position and orientation of the shutter for maximum image quality and stereoscopic effect. In such an embodiment, the driver examines the shadow to determine whether the shutter is in the correct location, and the driver turns segments on and off to maximize the stereoscopic effect or alignment.

The shutter driver can also be configured to over or under sample the left and/or right sides of the optics to accommodate for a rolling shutter in modern CMOS/MOS chip technologies. In short, some new camera systems do not have global shutters that turn on and off all at once, but rather rolling shutters that fire off line by line. In these rolling, or line-by-line shutters the result would be pockets of stereoscopic effect. So it is necessary to ensure that the shutter compensates for this and rolling shutter by being frequency matched.

It is also possible to use the controller to trigger a still camera to take two pictures at a time that would be synched to the right and left, thereby allowing for high quality stereoscopic images to be taken without requiring the mechanical movement of any of the elements of the adapter.

In another embodiment, an additional video processor circuit could be included in the shutter controller that would allow for the conversion of frame sequential stereoscopic images to a stereoscopic video output in any desired format, including: frame sequential, progressive, interlaced, side by side, checkerboard and horizontal interleave/line by line, etc.

The shutter driver may also be synchronized with a pulsed light so that the shutter driver and pulsed light system may be used together to capture high speed movement in 3D. For example, using such a system it is possible to perform 3D stroboscopy to study the vocal cords or other fast moving parts of the body.

Finally, because multielement/multipixel shutter is being used it is possible to selectively arrange the left and right sides (i.e., the position of the center pixel in relationship to the optical axis or image center) to help center the shutter location automatically with a feedback mechanism, or manually center the shutter position without having to mechanically adjust the shutter location.

Using the stereoscopic shutter controller also allows for image analysis. In one embodiment left and right images of the specimen are examined to determine the proper parallax of the image. Parallax is the is the apparent displacement or difference in the apparent position of an object viewed along two different lines of sight, and is measured by the angle or semi-angle of inclination between those two line, as shown schematically in FIG. 13. As shown in this schematic an observer (M) views object (O) from two different positions (P1 and P2). O is closer to the observer than the background (B), so the change of position from P1 to P2 forces a change of projection of O to the corresponding positions S1 and S2. Because B is much farther away than O, this change of projected positions is larger for O than for B. Accordingly, the observer perceives a visual change of position of O against B. To account for this in the current system, the width of the shutter can be adjusted, as shown in FIG. 14A to 14C, to adjust the parallax of the system and thereby improve image quality. As shown in these schematics as the parallax increases (from FIG. 14A to 14B to 14C) the number of right (110) and left (108) elements activated in the shutter (106) increases. Such a stereoscopic shutter width adjustment could be done manually through a shutter controller, or may alternatively be incorporated into a feedback loop system such that the shutter parallax would be automatically adjusted while zooming or magnifying objects. In such a system, the parallax adjustment can either be made in accordance with certain presets based on the level of magnification or zoom of the single lens optical device, or via range finding device, such as, for example, a short ranging sonar.

Although the above discussion has focused on shutter systems, it should be understood that the shutter may be of an electronic design in which the effect of a stereoscopic shutter is logical or software driven via image signal processing. For example, a new technology called light field capturing does not capture a focused image, but instead captures an image where the normal iris would be. As such, this process takes garbled data and then manipulates it to form a 3-D image. On example of such a device is a light field detector produced by the Lytro Co. In this device, the sensor detects the entire light field, rather than a single bit of information.

In any of the above embodiments, it should be understood that the device that captures the light image may include any suitable recording/image/camera capture system, such as, for example, a CCD, CMOS or light field capturing system, and such a capture system may be placed at the pupil and use electronic shuttering or the stereoscopic separation may be completed by image processing, as described above.

Doctrine of Equivalents

This description of the invention has been presented for the purposes of illustration and description. It is not intended to be exhaustive or to limit the invention to the precise form described, and many modifications and variations are possible in light of the teaching above. For example, although the above discussion of the adapter optics and circuits is described in relation with a microscope beams splitter or an endoscope, it should also be understood that the adapter can be equally applied to a microscope via the eyepiece of the microscope, or may be applied to other single lens optic devices. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

What is claimed is:

1. A stereoscopic optic adapter comprising:
   an optical adapter body configured to optically interconnect a single lens optical device defining a region to be imaged and an image capture device, the optical adapter body comprising at least a stereoscopic shutter and an optical relay;
   wherein the stereoscopic shutter comprises a plurality of separately controllable occludable regions configured to alternately occlude the light exiting from predetermined regions of the single lens optical device, and wherein the stereoscopic shutter is configured to produce a stereoscopic image from the imaged region of the single lens optical device;
   wherein the optical relay comprises one or more optical elements configured to transmit light from said single lens optical device through said stereoscopic shutter to said image capture device such that the stereoscopic shutter produces a stereoscopic image from the imaged region and transmits said stereoscopic image to said image capture device; and
   wherein the relative rotational alignment between the stereoscopic shutter and the camera is configured to ensure capture of the stereoscopic image by the image capture device;
   further comprising a programmable controller circuit interconnected between the stereoscopic shutter and the image capture device, wherein the programmable controller circuit controls the operation of each of the occludable regions of the stereoscopic shutter to frequency match the opening and closing of the stereoscopic shutter with the operation of a shutter of the image capture device by over and under sampling the occludable regions of the stereoscopic shutter.

2. The stereoscopic optic adapter of claim 1, wherein at least one predetermined region occludes a central portion of the region to be imaged, and wherein the stereoscopic shutter is configured to after the position of the occlusion of the central portion of the region to be imaged such that an optimal weighted image quality is obtained at about the edge of the optical field of the region to be images.

3. The stereoscopic optic adapter of claim 1, wherein the predetermined regions are the left and right regions of the imaged region.

4. The stereoscopic optic adapter of claim 1, wherein the width of the separately controllable occludable regions are adapted to be adjustable.

5. The stereoscopic optic adapter of claim 1, wherein the occludable regions are formed by a device selected from the group consisting of mechanical, electromechanical, chemical and material.

6. The stereoscopic optic adapter of claim 1, wherein the occludable regions are formed in a shape selected from the group consisting of curve, circular, hexagonal and rectangular.

7. The stereoscopic optic adapter of claim 1, wherein at least one of the occludable regions is fixed.

8. The stereoscopic optic adapter of claim 1, wherein the stereoscopic shutter is disposed between the optical relay and the single lens optical device.

9. The stereoscopic optic adapter of claim 1, wherein the stereoscopic shutter is disposed between the optical relay and the image capture device.

10. The stereoscopic optic adapter of claim 1, wherein the stereoscopic shutter is disposed with the optical relay.

11. The stereoscopic optic adapter of claim 1, wherein the optical relay includes an iris.

12. The stereoscopic optic adapter of claim 1, wherein the stereoscopic shutter is disposed within one of either the single lens optical device or the image capture device.

13. The stereoscopic optic adapter of claim 1, wherein the stereoscopic shutter acts as an iris.

14. The stereoscopic optic adapter of claim 1, wherein the stereoscopic shutter is incorporated within a zoom lens.

15. The stereoscopic optic adapter of claim 14, wherein the zoom lens comprises a series of converging lenses that are configured to be removably placed into optical alignment with the stereoscopic shutter to adjust the focal length of the adapter.

16. The stereoscopic optic adapter of claim 1, wherein the adapter is removable interconnected between the image capture device and the single lens optical device.

17. The stereoscopic optic adapter of claim 1, wherein the adapter is integrated within the image capture device.

18. The stereoscopic optic adapter of claim 1, wherein the adapter is integrated within the single lens optical device.

19. The stereoscopic optic adapter of claim 1, wherein the optical relay comprises an optical element configured such that the light entering the stereoscopic shutter has a conjugate configured to be nearly collimated.

20. The stereoscopic optic adapter of claim 1, wherein the optical relay is located directly adjacent to the exit of the single lens optical device.

21. The stereoscopic optic adapter of claim 1, wherein the single lens optic device is one of either a microscope or an endoscope.

22. The stereoscopic optic adapter of claim 1, wherein the image capture device is selected from the group consisting of mechanical still cameras, digital still cameras, CCDs, CMOSs, digital video camera, and light field capture systems.

23. The stereoscopic optic adapter of claim 1, wherein the adapter utilizes the entire area of the objective lens of the single lens optic device.

24. The stereoscopic optic adapter of claim 1, wherein at least one of the stereoscopic shutter and image capture device are mounted on adjustment stages configured to allow the rotational alignment of the stereoscopic shutter in relation to the image capture device.

25. The stereoscopic optic adapter of claim 24, wherein wherein the stereoscopic shutter and the image capture device are rotationally oriented such that the stereoscopic image is capturable by the image capture device; and
wherein the stereoscopic shutter and the image capture device are further rotatably interconnected such that the rotational orientation of the camera relative to the region to be imaged may be altered while maintaining the relative rotational alignment of the stereoscopic shutter and the image capture device.

26. The stereoscopic optic adapter of claim 1, further comprising an alignment feature viewable by the image capture device within the region to be imaged, and wherein the programmable controller circuit is configured to examine the shadow formed in the stereoscopic image by an alignment feature to optimize the operation of the stereoscopic shutter for optimum stereoscopic imaging.

27. The stereoscopic optic adapter of claim 1, wherein the programmable controller circuit is configured to determine and adjust the parallax of the image captured by the image capture device by altering the width of the predetermined regions and comparing a plurality of obtained images.

28. The stereoscopic optic adapter of claim 1, wherein the programmable controller circuit is configured to disable the stereoscopic shutter such that the adapter can be reconfigured into a non-stereoscopic device.

29. The stereoscopic optic adapter of claim 1, wherein the image capture device has a rolling shutter, and wherein the programmable controller circuit is configured to synchronize the stereoscopic shutter with said rolling shutter.

30. The stereoscopic optic adapter of claim 1, wherein the image capture device includes a still camera, and wherein the programmable controller circuit is configured to synchronize the still camera with the stereoscopic lens to capture a single still stereoscopic image.

31. The stereoscopic optic adapter of claim 1, wherein the programmable controller circuit is configured to allow for the conversion of data from the image capture device to a stereoscopic video output in a format selected from the group consisting of frame sequential, progressive, interlaced, side by side, checkerboard and horizontal interleave/line by line.

32. The stereoscopic optic adapter of claim 1, further comprising a pulsed light configured to emit a light intermittently, and wherein the programmable controller circuit is configured to synchronize the stereoscopic shutter with the pulsed light to allow for the capture of high speed motion capture by the image capture device.

33. The stereoscopic optic adapter of claim 1, wherein the programmable controller circuit is configured to center the stereoscopic shutter position with the optical axis of the single lens optic device.

34. The stereoscopic optic adapter of claim 1, wherein the programmable controller circuit is configured to determine the parallax of the image captured by the image capture device.

35. The stereoscopic optic adapter of claim 1, wherein the stereoscopic shutter is electronic and the stereoscopic effect is generated via image signal processing.

\* \* \* \* \*

UNITED STATES PATENT AND TRADEMARK OFFICE
CERTIFICATE OF CORRECTION

PATENT NO.       : 9,494,802 B2                                                Page 1 of 1
APPLICATION NO.  : 13/879785
DATED            : November 15, 2016
INVENTOR(S)      : May It is certified that error appears in the above-identified patent and that said Letters Patent is hereby corrected as shown below:

In the Claims
Claim 2, Line 5, delete "images," and insert --imaged--.
Claim 25, Line 9, delete "wherein.".

Signed and Sealed this
Twenty-fifth Day of April, 2017

Michelle K. Lee
*Director of the United States Patent and Trademark Office*